(No Model.)

J. E. W. COLEMAN.
REVERSIBLE SCRAPER FOR SCRAPING AWAY OLD PAPER, CALCIMINE, &c., FROM WALLS.

No. 304,909. Patented Sept. 9, 1884.

WITNESSES:
Otto Berger
C. Sedgwick

INVENTOR:
J. E. W. Coleman
BY Munn & Co
ATTORNEYS.

UNITED STATES PATENT OFFICE.

JOHN E. W. COLEMAN, OF SAN FRANCISCO, CALIFORNIA.

REVERSIBLE SCRAPER FOR SCRAPING AWAY OLD PAPER, CALCIMINE, &c., FROM WALLS.

SPECIFICATION forming part of Letters Patent No. 304,909, dated September 9, 1884.

Application filed May 28, 1884. (No model.)

*To all whom it may concern:*

Be it known that I, JOHN E. W. COLEMAN, of San Francisco, in the county of San Francisco and State of California, have invented a new and Improved Reversible Scraper, of which the following is a full, clear, and exact description.

The object of my invention is to provide an inexpensive, easily-handled, and efficient implement, more especially intended for scraping away the old paper, calcimine, or other finish of walls preparatory to the refinishing of the wall-surfaces.

The invention consists of a scraper constructed with a blade pivoted to a shank, and having a fastening-screw which passes through a lengthwise slot in the shank, to permit the screw to be moved back to allow the scraper to be turned or reversed to present another edge to the work, all as hereinafter fully described and claimed.

Reference is to be had to the accompanying drawings, forming part of this specification, in which similar letters of reference indicate corresponding parts in both the figures.

Figure 1:
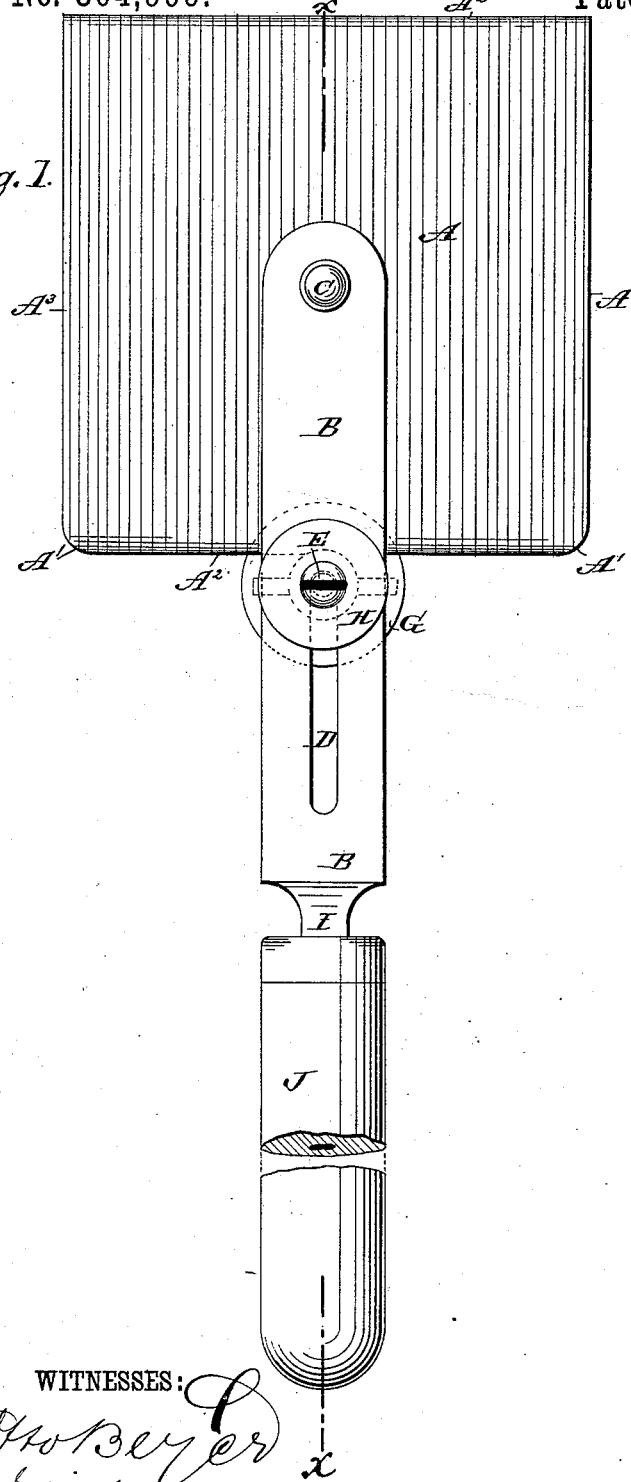
Figure 2:
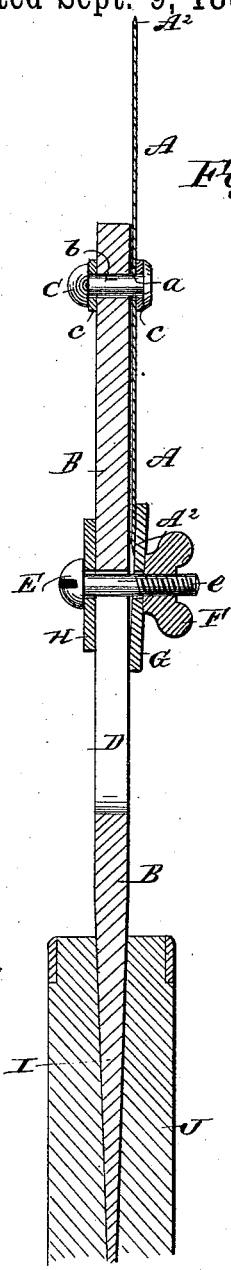

Figure 1 is a side or face view of my improved scraper with the handle broken away; and Fig. 2 is a longitudinal section on the line $x\ x$, Fig. 1.

The letter A indicates the steel blade of the scraper, which has a central hole, $a$, through which and a hole, $b$, of the shank B the pin or rivet C is passed to pivot the blade to the shank. Washers $c\ c$ may be used at opposite ends of the pivot, as shown. The shank B is slotted lengthwise, as at D, and a suitable headed screw-bolt, E, is passed through or into the slot, and receives on its threaded end $e$ the thumb screw or nut F, by which one edge of the scraper-blade A may firmly be clamped to the shank B on screwing up the nut either directly against the blade or against a washer or plate, G, interposed between the blade and the nut, to secure a firmer hold on the blade. A washer, H, may be used at the head end of the bolt, if desired.

I show the blade A made about square in shape, with two corners, A' A', rounded over, and with two opposite edges, $A^2 A^2$, sharpened, and the other two opposite edges, $A^3 A^3$, finished square across the thickness of the blade. The sharp edges $A^2$ are specially intended to be used in removing accumulations of paper or paris-white or calcimine from overcharged sound or uncracked walls and ceilings, and prepare the surfaces to receive new work, and the square edges $A^3$ for like work upon unsound or cracked wall-surfaces, which might be still further injured by the sharp edges of the blade.

It is evident that by loosening the nut F the bolt E may be moved along the slot D out of the way of the corners of the scraper-blade A as it is swung around on the pivot C to bring another one of the scraping-edges into position for use, and that when the blade is brought to the desired position the screw E, nut F, and plate G may be moved back again to permit the blade to again be clamped to the shank B by the screw.

The shank B, which is preferably made of metal, may be extended to itself from the handle of the implement; but I have shown it made with a tang, I, entering the ferruled end of a wooden handle, J, which may have any suitable length, and may be made in extensible sections, as the work to be done shall require.

My improved scraper, while more especially designed for use in preparing interior walls for a finish, is of course adapted for any class of work in which an implement of this character may advantageously be used.

Having thus described my invention, I claim as new and desire to secure by Letters Patent—

1. A scraper constructed with a blade pivoted to a shank or handle, and with a fastening-screw or equivalent device passing through a lengthwise slot in the shank, substantially as shown and described.

2. The combination, in a scraper, of a reversible blade, A, pivoted to the shank B, which is slotted at D, and the screw E and nut F, substantially as shown and described.

JOHN E. W. COLEMAN.

Witnesses:
TIMOTHY J. DWYER,
DAVID J. LEWIS.